United States Patent
Mukund et al.

(10) Patent No.: US 11,336,695 B2
(45) Date of Patent: May 17, 2022

(54) CONVERSATION-BASED POLICY DISTRIBUTION

(71) Applicant: Cisco Technology, Inc., San Jose, CA (US)

(72) Inventors: Laxmi Mukund, Karnataka (IN); Guruprasad Chandrasekaran, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 16/686,050

(22) Filed: Nov. 15, 2019

(65) Prior Publication Data
US 2021/0152602 A1 May 20, 2021

(51) Int. Cl.
*H04L 47/20* (2022.01)
*H04L 67/10* (2022.01)
*H04L 29/06* (2006.01)
*H04L 67/568* (2022.01)

(52) U.S. Cl.
CPC .............. *H04L 63/20* (2013.01); *H04L 47/20* (2013.01); *H04L 63/08* (2013.01); *H04L 67/2842* (2013.01); *H04L 67/10* (2013.01)

(58) Field of Classification Search
CPC ......... H04L 63/08; H04L 47/20; H04L 41/00; H04L 45/00; H04L 67/10; H04L 67/2842; H04L 63/20
See application file for complete search history.

(56) References Cited

U.S. PATENT DOCUMENTS

| | | | |
|---|---|---|---|
| 8,479,266 B1 * | 7/2013 | Delker | H04L 63/0272 726/4 |
| 8,750,144 B1 | 6/2014 | Zhou et al. | |
| 9,473,502 B2 | 10/2016 | Basso et al. | |
| 9,860,254 B2 | 1/2018 | Smith | |
| 10,097,378 B2 | 10/2018 | Dong et al. | |
| 10,193,706 B2 | 1/2019 | Bhattacharya et al. | |
| 2001/0028660 A1 * | 10/2001 | Carolan | H04L 63/108 370/466 |
| 2006/0005254 A1 * | 1/2006 | Ross | H04L 63/08 726/27 |
| 2014/0317682 A1 * | 10/2014 | Erickson | H04L 63/20 726/1 |
| 2015/0271710 A1 * | 9/2015 | Zhang | H04W 36/0011 370/331 |
| 2017/0041343 A1 * | 2/2017 | Wong | H04L 63/105 |

* cited by examiner

*Primary Examiner* — Frantz B Jean
(74) *Attorney, Agent, or Firm* — Lee & Hayes, P.C.

(57) ABSTRACT

This disclosure describes techniques for improving policy distribution in a network. The policy distribution may be improved based on a conversation between devices of the network. The techniques include initiating a policy download trigger based on the conversation. The policy download trigger may specify a particular destination device for a data transfer across the network. Therefore, policies specific to the destination device may be downloaded and/or installed at points of enforcement in the network. In this way, the techniques described herein may improve the efficiency of network resource use.

20 Claims, 7 Drawing Sheets

```
                            300
                              ↘

┌─────────────────────────────────────────────────────────────────────┐
│ RECEIVE A COMMUNICATION THAT INCLUDES IDENTIFICATION OF A DESTINATION DEVICE │
│ AND INCLUDES A SOURCE DEVICE ADDRESS OF A SOURCE DEVICE ASSOCIATED WITH AN  │
│   EDGE NODE, WHERE THE SECOND EDGE NODE IS REQUESTING A DATA TRANSFER       │
│   BETWEEN THE SOURCE DEVICE AND THE DESTINATION DEVICE ACROSS A NETWORK     │
│                                  302                                        │
└─────────────────────────────────────────────────────────────────────┘
                                  │
                                  ▼
┌─────────────────────────────────────────────────────────────────────┐
│        SEND A DESTINATION DEVICE ADDRESS OF THE DESTINATION DEVICE         │
│                         TO THE EDGE NODE                                   │
│                                304                                         │
└─────────────────────────────────────────────────────────────────────┘
                                  │
                                  ▼
┌─────────────────────────────────────────────────────────────────────┐
│  SEND A POLICY DOWNLOAD TRIGGER TO AN AUTHENTICATION SERVER, THE POLICY    │
│       DOWNLOAD TRIGGER INCLUDING THE SOURCE DEVICE ADDRESS                 │
│                                306                                         │
└─────────────────────────────────────────────────────────────────────┘
                                  │
                                  ▼
┌─────────────────────────────────────────────────────────────────────┐
│       RECEIVE A POLICY FROM THE AUTHENTICATION SERVER, THE POLICY          │
│       RELATING TO THE DATA TRANSFER BETWEEN THE SOURCE DEVICE              │
│                      AND THE DESTINATION DEVICE                            │
│                                308                                         │
└─────────────────────────────────────────────────────────────────────┘
                                  │
                                  ▼
┌─────────────────────────────────────────────────────────────────────┐
│       RECEIVE THE DATA TRANSFER ORIGINATING FROM THE SOURCE DEVICE         │
│                                310                                         │
└─────────────────────────────────────────────────────────────────────┘
                                  │
                                  ▼
┌─────────────────────────────────────────────────────────────────────┐
│    BASED AT LEAST ON THE POLICY, DETERMINE WHETHER TO COMMUNICATE          │
│           THE DATA TRANSFER TO THE DESTINATION DEVICE                      │
│                                312                                         │
└─────────────────────────────────────────────────────────────────────┘
```

FIG. 3

CONVERSATION-BASED POLICY DISTRIBUTION

TECHNICAL FIELD

The present disclosure relates generally to improving policy distribution across a network based on conversation among devices of the network, thereby improving performance of the network.

BACKGROUND

Software-defined access (SDA) may be used to manage routing of data from source devices to destination devices across a virtualized network. The routing of data may pass through nodes (e.g., edge nodes), which forward the data along to destination devices with which they are associated. Policies may be created that define which destination devices may receive data from which source devices. In this respect, the node can be considered a point of enforcement of a policy. For example, a node may receive data from the network, then forward the data to an appropriate destination device based on a particular policy. However, downloading policies to the node may present several problems. For instance, the node may have limited ability to store policies for every destination device with which the node is associated. Additionally, network resources may be wasted by downloading policies that are not needed by the node. Also, as the virtualized network structure changes with changing cloud computing resource demands, the policies may need to be updated. Thus, policies stored at the node may become out-of-date, potentially leading to errors in data routing. Therefore, it may be advantageous to optimize the distribution of policies across the network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for devices of a cloud computing network to distribute policies based at least in part on a conversation.

DESCRIPTION OF EXAMPLE EMBODIMENTS

Overview

Figure 1A:
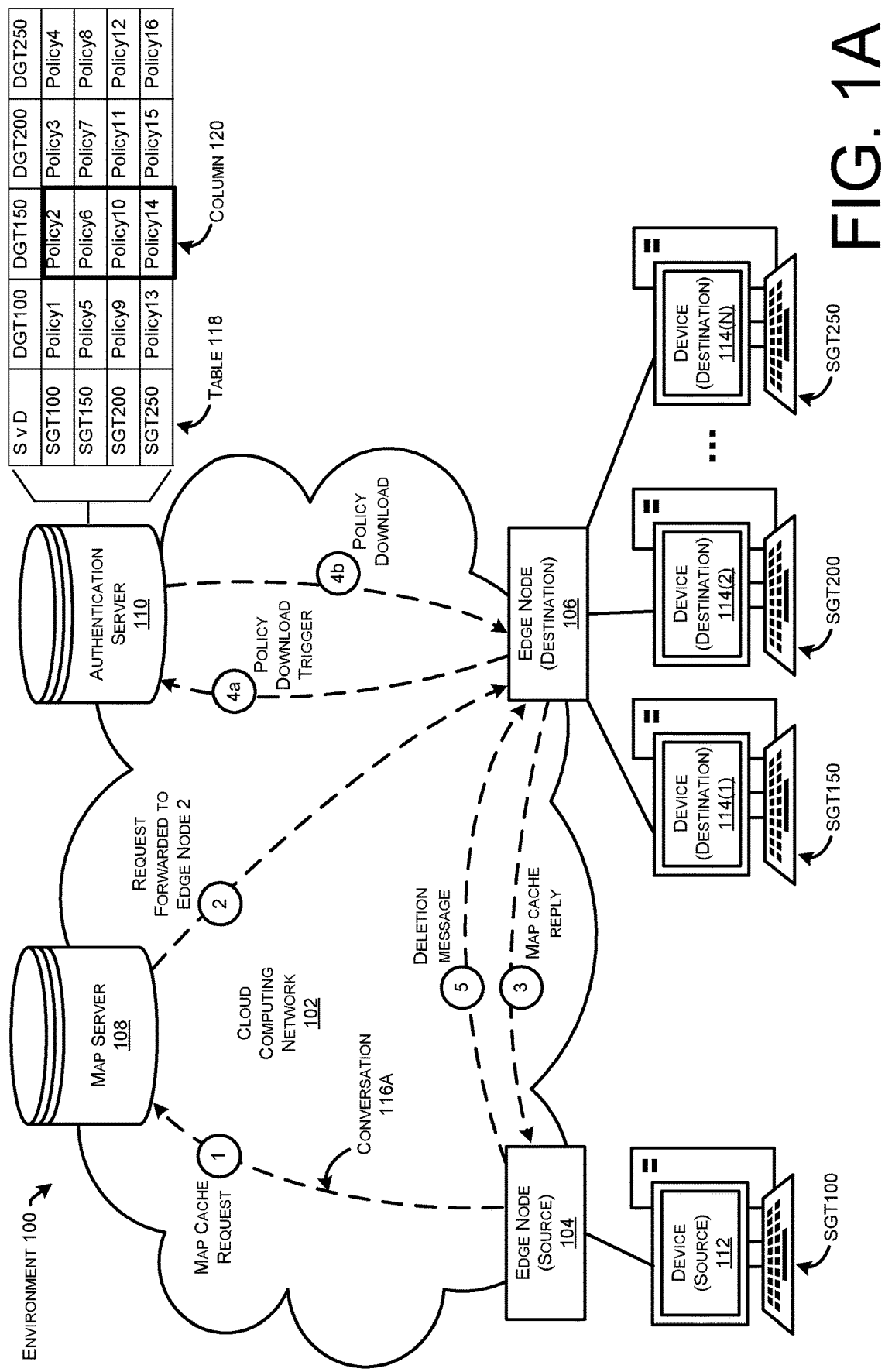
FIG. 1A illustrates a component diagram with an example conversation for policy distribution in a network in accordance with the present concepts.

This disclosure describes a method of utilizing a conversation among devices of a network to manage the distribution of policies across the network. The method includes receiving, at a first edge node in a network, a map cache request from a map server in the network, the map cache request including an indication of a destination device with which a second edge node is requesting to communicate. Based at least in part on receiving the map cache request the first node may select, from among a first host device and a second host device communicatively coupled to the first edge node, the first host device as the destination device. The first node may also send an indication of a destination address associated with the destination device to the second edge nod, based at least in part on receiving the map cache request. Further, the method includes sending, from the first edge node, a policy download trigger to an authentication server to trigger download of a policy associated with transferring data to the destination device and receiving, at the first edge node, the policy from the authentication server. Additionally, the method includes receiving, at the first edge node, a data transfer originating from a source device associated with the second edge node. The method further includes determining, based at least in part on the policy, whether to communicate the data transfer to the destination device.

Additionally, the techniques described herein may be performed by a system and/or device having non-transitory computer-readable media storing computer-executable instructions that, when executed by one or more processors, performs the method described above.

Example Embodiments

This disclosure describes techniques for managing the distribution of policies across a network. In some implementations, the distribution may be managed based on a conversation among devices of the network, for conversation-based policy distribution. For example, the conversation may be used to reduce an amount of policies downloaded and/or installed at any given node of the network. Additionally, or alternatively, policies installed at the node may be deleted based on the conversation. As such, the distribution of policies may be improved, based on the conversation, for more efficient utilization of network resources.

As described herein, a node may be any point of enforcement through which data travels across a network from a source device to a destination device. As such, the node may be a point where a policy regarding routing of the data is enforced. The node may be an edge node. The node may be manifest as hardware (e.g., a switch), or may be virtualized. In some examples, the node may be a computing device, such as a network access device (NAD). In the examples described herein, the use of NAD and/or edge node as the point of enforcement is not meant to be limiting.

In some examples, potential source and/or destination devices within a network may receive a label that informs the routing of data to and/or from that device. For instance, the devices may be authenticated and assigned security group tag (SGT) values. A policy may be created to describe which destination device(s) may receive data (e.g., a data packet) from which source device(s) based on the assigned SGTs values of the devices. An NAD may enforce the policies based on the SGT values. In a particular instance where a destination device is an intended recipient of data, a security group tag of the destination device may be considered a destination group tag (DGT).

Flexibility of a virtualized network structure may be improved by making the DGT available (e.g., known) closer to the destination device. For example, rather than carrying the DGT in-line with a particular data packet across the network, the DGT may only need to be available at the NAD associated with the destination device for that particular data packet. The DGT does not need to be carried in-line with the data packet where the NAD has access to a policy that describes the DGT. The NAD may learn the DGT from the policy and forward the data packet to the appropriate destination device accordingly. In this way, the network has more flexibility to route and/or reroute the data packet to an available destination device based on current network resource demands.

An NAD may be associated with one or more destination devices. The association of the one or more destination devices with the NAD may change as the virtualized network structure changes with changing cloud computing resource demands. For instance, destination devices may be added or removed from association with the NAD. Downloading policies for every possible destination device at the NAD may be impractical, and the impracticality may be compounded by the changing nature of the virtualized network structure. Further, policies downloaded to the NAD may take up valuable storage space at the NAD. For instance, policies may consume ternary content-addressable memory (TCAM). The cost-effectiveness of networks may be improved where the amount of TCAM required at an NAD is lessened. For at least these reasons, it may be advantageous to reduce the amount of policies downloaded and/or installed at the NAD.

In some implementations, a conversation among devices of the network may be used to determine a subset of available policies that an NAD may need to utilize. The conversation may be related to the transfer of data (e.g., data traffic) across the network. For instance, at any given time, an NAD may only need a policy related to data traffic that is intended for a particular destination device with which the NAD is associated. Stated another way, even though the NAD may be associated with several destination devices, the NAD may not need policies for all of the destination devices if the NAD is not routing traffic to all of the destination devices. The conversation about the transfer of data may help differentiate the destination devices for which the NAD may need policies. In some examples, an SGT associated with a particular data packet may help determine which policy an NAD may need in order to forward the particular data packet. The NAD may learn the SGT from the conversation, download a policy associated with the SGT, and then forward the particular data packet according to the policy. In some examples, downloading of a policy to the NAD may be triggered by initiation of sending of a particular data packet to the NAD. In this sense, conversation-based policy distribution may be considered a pull model, where the policies may not be downloaded and/or installed until there is data traffic to a particular destination device. Stated another way, a policy may only need to be downloaded when the conversation starts.

In some examples, a conversation among devices of the network may also inform deletion of policies that have been downloaded and/or installed at the NAD. For instance, the conversation may indicate that the transmission of data has ceased, such as after a particular amount of time has passed with no data being transferred. In this case, policies associated with the data traffic may no longer be needed at the NAD. Therefore, relevant policies installed at the NAD may be deleted. Additionally, or alternatively, a destination device associated with an NAD may be moved away from the NAD, or be shut down, for example. In this case, any policies installed at the NAD that are relevant to the destination device may be deleted. As such, TCAM space at the NAD may be conserved through timely curation of installed policies.

To summarize, conversation-based policy distribution may improve the efficient utilization of cloud computing resources. When challenged with increasing mobility, static policies to define working groups of network devices may be impractical. Further, downloading unrequired policies to points of enforcement may unnecessarily consume network bandwidth, and/or may produce more policy download errors. Untimely updating of policies at the points of enforcement may lead to data transmission errors. Additionally, where TCAM space on NADs is limited, there is a crucial need to optimize utilization of TCAM by reducing an amount of installed policies, and potentially only installing policies required at the point of enforcement. Efficient deletion of policies that are no longer required may be similarly beneficial. With conversation-based policy distribution, reduction of the amount of policies downloaded and/or installed at any given point of enforcement may be significant. Furthermore, techniques consistent with conversation-based policy distribution may be able to assist data transfer across the network while not increasing latency over traditional policy distribution techniques.

As noted above, although the examples described herein may refer to an NAD as the point of enforcement of a policy, the techniques can generally be applied to any node in a network. Further, the techniques are generally applicable for any network of devices managed by any entity where virtual resources are provisioned. In some instances, the techniques may be performed by software-defined access (SDA), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to managing the distribution of policies across a network. For instance, the techniques described herein may reduce the amount of storage, dropped data, latency, and other issues experienced in networks due to lack of network resources and/or improper routing of data. By improving the distribution of policies across a network, the network communications performed by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
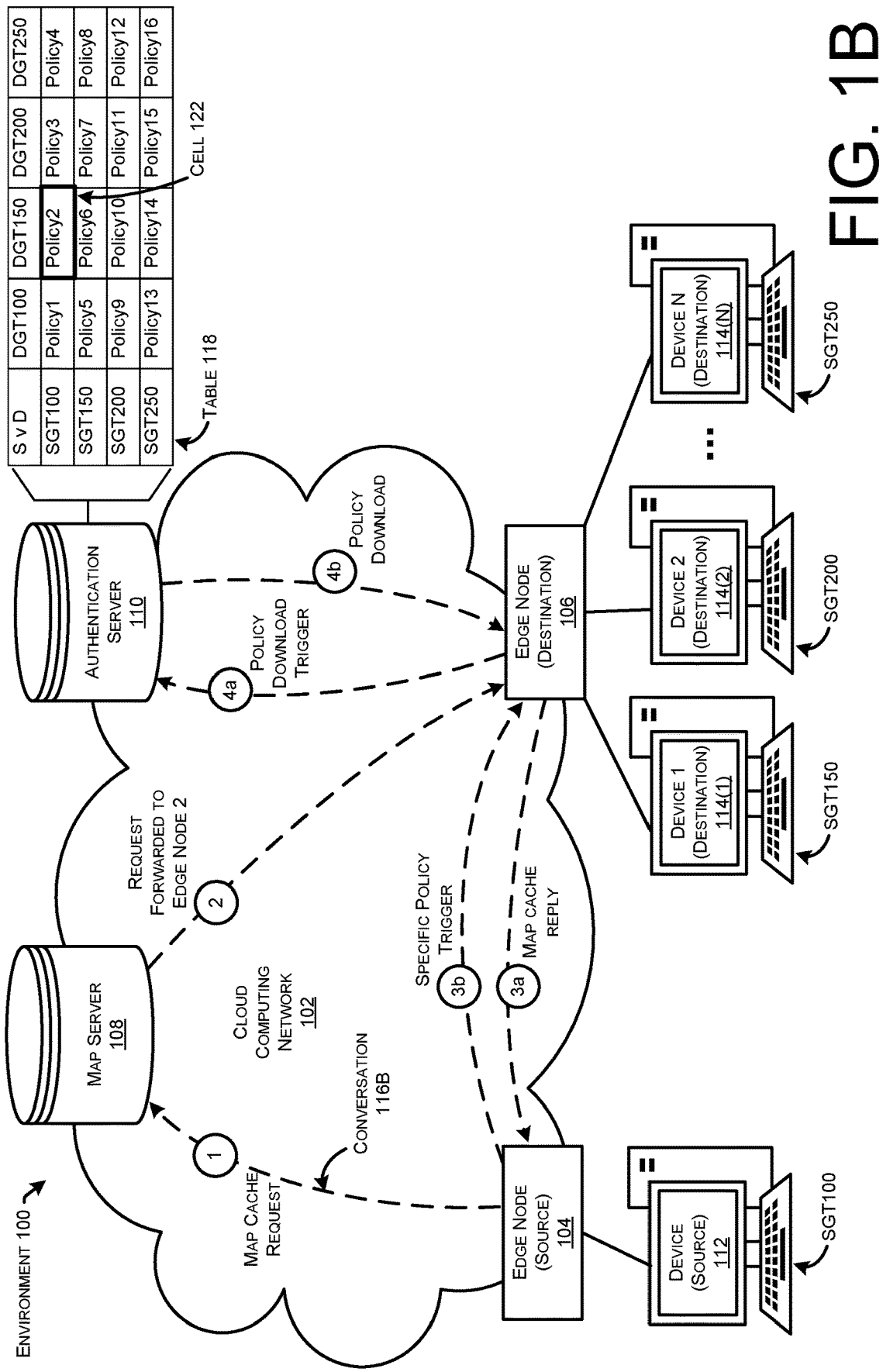
FIG. 1B illustrates a component diagram with an example conversation for policy distribution in a network in accordance with the present concepts.
Figure 1C:
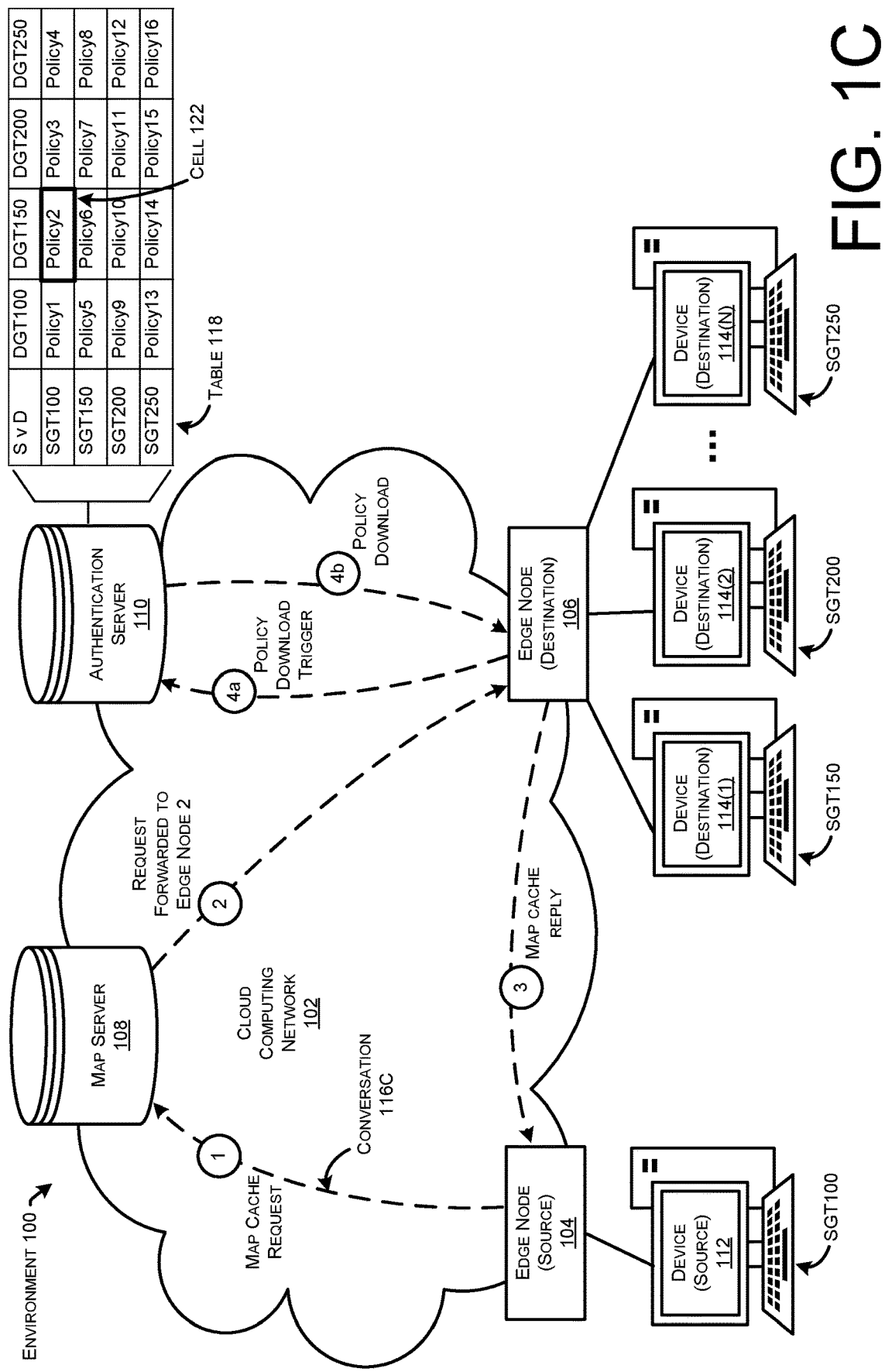
FIG. 1C illustrates a component diagram with an example conversation for policy distribution in a network in accordance with the present concepts.

FIGS. 1A-1C collectively illustrate an example environment 100 in accordance with the present conversation-based policy distribution concepts. Example environment 100 can include cloud computing network 102, edge node 104, edge node 106, map server 108, and authentication server 110. In this example, edge nodes 104 and/or 106 may be manifest as network access devices (NADs).

In some examples, the cloud computing network 102 may be utilized to transfer data between cloud computing resources. For example, edge node 104 may be communicatively coupled to device 112. Edge node 106 may be communicatively coupled to devices 114. Devices 112 and devices 114 may be considered host devices, and may be utilized as cloud computing resources. As illustrated in FIGS. 1A-1C, devices 114 include device 114(1), device 114(2), and device 114(N), indicating that multiple destination devices may be associated with edge node 106. Only one device 112 is shown in FIGS. 1A-1C to avoid clutter on the drawing page. The number of devices 112 and/or 114 in FIGS. 1A-1C is not meant to be limiting.

In some instances, edge node 104 may be considered a "source" edge node, and edge node 106 can be considered a "destination" edge node. In this case, device 112 (e.g., host device) may be considered a source device, and any of devices 114 (e.g., host devices) may be considered destination devices. Data may be communicated across cloud computing network 102 from source device 112 to destination device 114(1), for instance. In general, any number of host devices, source devices, and/or destination devices may be associated with any edge node and/or network access device, and/or the number may vary over time as the virtualized network structure changes.

In some implementations, a conversation may occur between various devices associated with the cloud computing network 102. In FIG. 1A, example conversation 116A is illustrated as numbered, dashed lines extending between edge nodes 104 and 106, map server 108, and authentication server 110. Similarly, FIG. 1B includes example conversation 116B and FIG. 1C includes example conversation 116C. The example conversations 116A-C will be described in more detail below.

FIGS. 1A-1C also include table 118. In some examples, table 118 may be associated with authentication server 110. Table 118 can be a look-up table for policies that can be applied to data transfer within cloud computing network 102, for instance. As shown in FIGS. 1A-1C, table 118 may include rows associated with source devices and columns associated with destination devices, such that the table may be considered a "source vs. destination" matrix. In this case, table 118 includes 16 policies, termed Policy1 through Policy16. In some examples, individual policies may be different, similar, and/or the same as other policies in table 118. The policy naming convention used in table 118 is not meant to be limiting.

Also, in FIGS. 1A-1C, devices 112 and 114 are shown with security group tag (SGT) labels. For instance, device 112 is shown with the label "SGT100," device 114(1) is shown with the label "SGT150," device 114(2) is shown with the label "SGT200," and device 114(N) is shown with the label "SGT250." In table 118, the left-most column includes security group tags (SGTs) assigned to various source devices that may be associated with the cloud computing network 102. The top-most row of table 118 includes destination group tags (DGTs) of various destination devices that may be associated with the cloud computing network 102. As noted above, in an instance where data is sent from a source device to a destination device, the security group tag (SGT) of the destination device may be considered a destination group tag (DGT). Therefore, in environment 100, where data is sent from source device 112 to destination device 114(1), the SGT150 assigned to destination device 114(1) may be considered DGT150.

Referring again to table 118, a policy for sending data from source device 112 to destination device 114(1) may be found at the intersection of the row that includes SGT100 and the column that includes DGT150. In this instance, "Policy2" may apply. Note that table 118 is simply one example representation of how policies regarding data transfer may be arranged. Other methods are contemplated for storing, arranging, and/or accessing policies.

In some examples, authentication server 110 may authenticate devices (e.g., host devices) associated with the cloud computing network 102. Authentication server 110 may be manifest as a Cisco Identities Service Engine (Cisco ISE), or a Cisco Secure Access Control System (Cisco ACS), for instance. Authentication server 110 may assign SGTs to devices, such as devices 112 and/or 114. In some examples, a policy may be manifest as a security group access control list (SGACL).

In the example illustrated in FIG. 1A, authentication server 110 may supply edge node 106 with policies that edge node 106 may utilize for enforcement related to data transfer. However, network resources may unnecessarily be wasted, such as where an excessive amount of policies represented in table 118 were downloaded to edge node 106. Therefore, it may be advantageous to reduce, and potentially optimize, an amount of policies downloaded and/or installed at edge node 106. For example, in an instance where edge node 106 learns that data traffic is intended for destination device 114(1), the policies in table 118 associated with "DGT150" may be of use to edge node 106. Thus, the policies in column 120, indicated with a bold box, may be selected for downloading from the authentication server 110 to the edge node 106. The selected policies are "Policy2," "Policy6," "Policy10," and "Policy14" in this case. Selective downloading of the policies in column 120 may be an improvement over downloading other, unneeded policies from table 118. In order to facilitate the selection of policies, edge node 106 may learn of the data traffic intended for destination device 114(1) via a conversation, such as example conversation 116A.

As introduced above, example conversation 116A is illustrated in FIG. 1A as numbered, dashed lines extending between edge nodes 104 and 106, map server 108, and authentication server 110. In this case, data is intended to be transferred (e.g., communicated) from source device 112 to destination device 114(1).

At step "1" of example conversation 116A, edge node 104 may communicate with map server 108. For instance, edge node 104 may send a map cache request to map server 108. The map cache request may be triggered by the initiation of a data transfer from source device 112 to destination device 114(1). The map cache request may be a request to receive a map cache reply at edge node 104. Receipt of an appropriate map cache reply at edge node 104 may enable communication between source device 112 and destination device 114(1). Map server 108 may be a map server and/or map resolver with knowledge of network mapping. For example, map server may have access to the address (e.g., internet protocol (IP) address) of an appropriate network access device and/or destination device to which the map cache request may be forwarded in order to facilitate data traffic across the network. Stated another way, map server 108 may be a database that keeps track of devices in the network and/or how to access devices in the network. In this case, map server 108 may know, and/or be capable of learning, the address of edge node 106 and/or destination device 114(1). For instance, when destination device 114(1) becomes coupled to edge node 106, edge node 106 may send a message conveying the coupling to map server 108. Further, edge node 106 may be considered a routing locator (RLOC) for destination devices 114.

At step "2" of example conversation 116A, map server 108 may communicate with edge node 106. For instance, map server 108 may forward the map cache request to edge node 106. In this way, edge node 106 may learn that edge node 104 would like to communicate.

At step "3" of example conversation 116A, edge node 106 may communicate with edge node 104. The communication in this step may be in response to receiving the map cache request. For instance, the map cache request may contain the address of edge node 104 so that edge node 106 may learn how to contact edge node 104. In some examples, edge node 106 may communicate to edge node 104 that destination device 114(1) is behind (e.g., coupled to) edge node 106 along a flow path, and that edge node 104 may send data traffic to edge node 106 to reach destination device 114(1). For example, the communication may be a map cache reply sent to edge node 104. The map cache reply may include information utilized to form a map cache entry. For instance, the map cache reply may contain a destination address (e.g., IP address) of destination device 114(1), and sending the map cache reply to edge node 104 may result in the destination address being included in a map cache entry at edge node 104. With the map cache entry, edge node 104 may be able to communicate with edge node 106 and/or destination device 114(1).

At step "4a" of example conversation 116A, edge node 106 may send a policy download trigger to authentication server 110. The policy download trigger may be a request for information regarding the initiated data transfer. For example, the policy download trigger may include information regarding destination device 114(1). The policy download trigger may be considered a request for a security group tag (SGT) associated with destination device 114(1), for instance.

At step "4b" of example conversation 116A, a policy download may be performed from authentication server 110 to edge node 106. In the example illustrated in FIG. 1A, the policies included in column 120 of table 118 may be downloaded and/or installed at edge node 106. Since column 120 includes Policy2, edge node 106 may be able to utilize Policy2 to enforce rules associated with the data transfer between source device 112 and destination device 114(1).

In some examples, steps "3" and "4a" of example conversation 116A may occur and/or be initiated simultaneously, contemporaneously, and/or at different times. Stated another way, there may not be any delay between step 3 and step 4a, or vice versa. In this manner, the map cache entry may be installed at edge node 104 at the same time or roughly the same time that policies from column 120 in table 118 are being installed at edge node 106. For this reason, there may be no delay in data transfer, or little or no significant additional latency, between a network utilizing conversation-based policy distribution techniques and another network utilizing other techniques for downloading polices at points of enforcement.

As introduced above, conversation-based policy distribution techniques may include techniques for deleting policies from the point of enforcement. In some examples, additional conversation among the devices of the network may provide information relevant to policy deletion. For example, map cache entries may have a time-out value. Map cache entries may also be removed in cases where they have not been accessed for a period of time. Referring again to FIG. 1A, as illustrated at step "5," removal of a map cache entry at edge node 104 may trigger sending of a deletion message from edge node 104 to edge node 106. The deletion message may inform edge node 106 that the map cache entry related to destination device 114(1) has been removed. Edge node 106 may then delete policies associated with source device 112 and/or destination device 114(1), such as policies "Policy2," "Policy6," "Policy10," and/or "Policy14." In some examples, deletion messages may be considered part of the conversation 116A. Other triggers are contemplated for sending of deletion messages, and/or deletion messages may be sent to and/or from other network devices. In this manner, conversation-based policy distribution may improve the efficient use of network resources, such as by freeing ternary content-addressable memory (TCAM) space at network access devices (NADs).

FIG. 1B illustrates a second example conversation 116B. Similar to example conversation 116A (FIG. 1A), example conversation 116B includes numbered, dashed lines extending between edge nodes 104 and 106, map server 108, and authentication server 110. Also, in this case, data is intended to be transferred (e.g., communicated) from source device 112 to destination device 114(1). Description of like elements between FIGS. 1A and 1B will not be repeated for sake of brevity.

Example conversation 116B shown in FIG. 1B may be viewed as a second example of optimization in accordance with conversation-based policy distribution concepts. In example conversation 116B, selection of policies for download from authentication server 110 to edge node 106 may be more specific than in example conversation 116A (FIG. 1A). In example conversation 116B, steps "1" and "2" may be substantially the same as described for example conversation 116A. Also, in example conversation 116B, step "3a" may be substantially the same as step "3" in example conversation 116A. In example conversation 116B, step "3b" may be an additional step as compared to example conversation 116A.

At step "3b" of example conversation 116B, edge node 104 may communicate with edge node 106. For example, edge node 104 may send a specific policy trigger to edge node 106. The specific policy trigger may include information regarding a flow path (e.g., netflow) from source device 112 to destination device 114(1). For instance, while the map cache reply and/or the map cache entry may include information regarding the destination address, the specific policy trigger may include information (e.g., identification(s), address(es), etc.) regarding both source device 112 and destination device 114(1). In some examples, netflow information may be used to identify a specific policy that applies to a particular flow path between a particular source and a particular destination, as described in step 4a of example conversation 116B.

At step "4a" of example conversation 116B, edge node 106 may send a policy download trigger to authentication server 110. In this case, the policy download trigger may include information associated with the specific policy trigger, such as the netflow information from step 3b and/or other information regarding source device 112 and/or destination device 114(1). Upon receipt of the policy download trigger, the authentication server 110 may be able to select "Policy2" in cell 122, indicated with the bold box in table 118. Note that the selection of cell 122 is more specific than the selection of column 118 in the example shown in FIG. 1A, which included multiple cells. As such, example conversation 116B (FIG. 1B) may represent a second level of optimization in accordance with conversation-based policy distribution concepts.

At step "4b" of example conversation 116B, a policy download may be performed from authentication server 110 to edge node 106. In the example illustrated in FIG. 1B, Policy2 may be downloaded and/or installed at edge node 106, and edge node 106 may be able to utilize Policy2 to enforce rules associated with the data transfer between source device 112 and destination device 114(1).

In the example illustrated in FIG. 1B, policies may be deleted from edge node 106. In some examples, the netflow information (described above) may be used to determine whether deletion of a policy is warranted. In this case, in example conversation 116B, netflows that are inactive may be used to determine that a policy may be deleted. For instance, in response to a period of inactivity of a netflow of data from source device 112 to destination device 114(1), edge node 106 may delete Policy2. Similar to the example described above for FIG. 1A, deletion messages may be part of the conversation among the devices of cloud computing network 102, indicating the inactivity of the netflow, indicating that particular polices are no longer needed, and/or indicating that policies may be deleted. (Deletion messages are not illustrated in FIG. 1B to avoid clutter on the drawing page.) In response to receipt of a deletion message, edge node 106 may delete Policy2 and/or other information related to the combination of source device 112 and destination device 114(1).

FIG. 1C illustrates a third example conversation 116C. Similar to example conversations 116A (FIG. 1A) and 116B (FIG. 1B), example conversation 116C includes numbered, dashed lines extending between edge nodes 104 and 106, map server 108, and authentication server 110. Also in this case, data is intended to be transferred (e.g., communicated) from source device 112 to destination device 114(1). Description of like elements and/or aspects of the example conversations between FIGS. 1A-1C will not be repeated for sake of brevity.

Example conversation 116C shown in FIG. 1C may be viewed as a third example of optimization in accordance with conversation-based policy distribution concepts. In example conversation 116C, selection of policies for download from authentication server 110 to edge node 106 may be more specific than in example conversation 116A (FIG. 1A). In example conversation 116C, at step "1," the communication sent from edge node 104 to map server 108 may contain information regarding source device 112. For example, the map cache request may include the address (e.g., IP address) of source device 112. Therefore, when the map cache request is forwarded from the map server 108 to edge node 106, edge node 106 may learn the address of the source device 112. In this case, at step "4a" edge node 106 may include the information regarding source device 112 in the policy download trigger sent to authentication server 110. Thus, at step "4b" the policy download from authentication server 110 to edge node 106 may include Policy2 from cell 122 in table 118. Stated another way, the information regarding source device 112 in the policy download trigger may allow authentication server 110 to select a policy that edge node 106 needs with specificity.

Note that the policy download result in step "4b" is generally the same between example conversations 116B and 116C. For example, in these examples, Policy2 may be downloaded, while other unnecessary policies may not be downloaded. However, example conversation 116C may represent a timing advantage and/or possible reduction in latency over example conversation 116B. For instance, in example conversation 116C, edge node 106 does not wait for a communication from edge node 104 before sending the policy download trigger to authentication server 110 (step 4a). In this instance, edge node 106 has already received the source information from map server 108 (in step 2). Therefore, edge node 106 already effectively has the specific policy trigger to include with the policy download trigger, specifying the individual Policy2, in this case.

As described above, conversation-based policy distribution can use conversation within a network to effect a smart policy download scheme. In some examples, a point of enforcement may use conversation among network devices as an indication to pre-emptively prepare a destination for data transfer. For instance, in the example conversations described above, an edge node pre-emptively triggered a policy download based at least in part on a map cache request forwarded from a map server. The example conversations described above also represent varying levels of optimization and/or specificity in policy download in accordance with conversation-based policy distribution. In this manner, conversation monitoring may facilitate ever-more flexible and/or more mobile virtualized network structures. Thus, conversation-based policy distribution may be able to significantly improve the efficient use of network resources.

Figure 2:
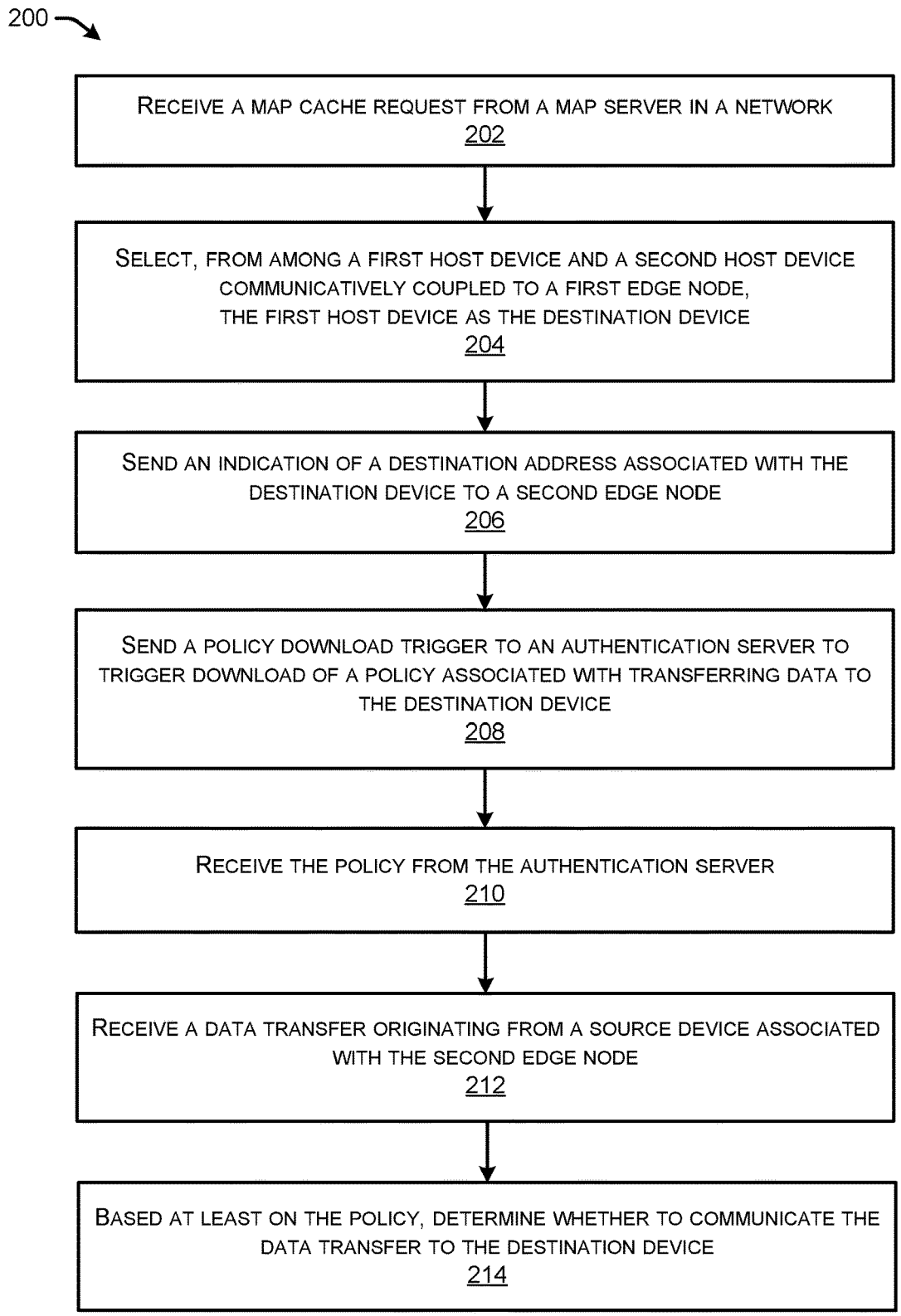
FIG. 2 illustrates a flow diagram of an example method for devices of a cloud computing network to distribute policies based at least in part on a conversation.

FIGS. 2 and 3 illustrate flow diagrams of example methods 200 and 300 that illustrate aspects of the functions performed at least partly by the cloud computing network 102 as described in FIGS. 1A-1C. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for devices of a cloud computing network 102 to perform policy distribution based on a conversation between the devices. In some examples, method 200 may be performed by a computing device comprising one or more processors and one or more non-transitory computer-readable media storing computer-executable instructions that, when executed by the one or more processors, cause the one or more processors to perform method 200.

At 202, a first edge node 106 (e.g., computing device) may receive a map cache request from a map server 108 in a network 102. For instance, the map cache request may include an indication of a destination device 114(1) with which a second edge node 104 is requesting to communicate.

At 204, the first edge node 106 may select, from among a first host device and a second host device communicatively coupled to the first edge node, the first host device as the destination device. In some examples, the first edge node 106 may perform the selection based at least in part on receiving the map cache request.

At 206, the first edge node 106 may send an indication of a destination address associated with the destination device to the second edge node. In some examples, the first edge node 106 may send the indication based at least in part on receiving the map cache request.

At 208, the first edge node 106 may send a policy download trigger to an authentication server to trigger download of a policy associated with transferring data to the destination device. In some examples, initiations of sending the indication of the destination address of the destination device and sending the policy download trigger may occur simultaneously (e.g., at approximately the same time).

At 210, the first edge node 106 may receive the policy from the authentication server. In some cases, the first edge node 106 may receive multiple policies associated with the destination device from the authentication server. In this case, the first edge node 106 may select the policy from the multiple policies based on source device information that may have been included in the data transfer, such as an identification and/or address of the source device.

At 212, the first edge node 106 may receive a data transfer originating from a source device associated with the second edge node.

At 214, based at least in part on the policy, the first edge node 106 may determine whether to communicate the data transfer to the destination device.

In some examples, method 200 may further include receiving, at the first edge node 106 and from the second edge node 104, a specific policy trigger that includes information regarding the source device and the destination device. The policy download trigger may include the specific policy trigger in some cases. For instance, the policy download trigger may refer to a specific source device and destination device combination, such as a flow path (e.g., netflow). Furthermore, method 200 may include receiving a deletion message as part of a conversation among the devices of the network. For example, the first edge node 106 may receive a deletion message from the second edge node 104. In some examples, first edge node 106 may delete the policy based at least in part on the deletion message.

FIG. 3 illustrates a flow diagram of an example method 300 for devices of a cloud computing network 102 to perform policy distribution based on a conversation between the devices. In some examples, method 300 may be performed by a computing device comprising one or more processors and one or more non-transitory computer-readable media storing computer-executable instructions that, when executed by the one or more processors, cause the one or more processors to perform method 300.

At 302, the computing device (e.g., edge node 106) may receive a communication that includes identification of a destination device associated with the computing device. The communication may also include a source device address of a source device associated with an edge node (e.g., edge node 104). In some examples, the edge node may be requesting a data transfer between the source device and the destination device.

At 304, the computing device may send a destination device address of the destination device to the edge node.

At 306, the computing device may send a policy download trigger to an authentication server. The policy download trigger may include the source device address and/or other information identifying the source device. In some cases, the computing device may send the destination address to the second edge node and the policy download trigger to the authentication server concurrently.

At 308, the computing device may receive, in response to sending the policy download trigger to the authentication server, a policy from the authentication server. The policy may relate to the data transfer between the source device and the destination device.

At 310, the computing device may receive the data transfer originating from the source device.

At 312, the computing device may determine, based at least in part on the policy, whether to communicate the data transfer to the destination device.

Figure 4:
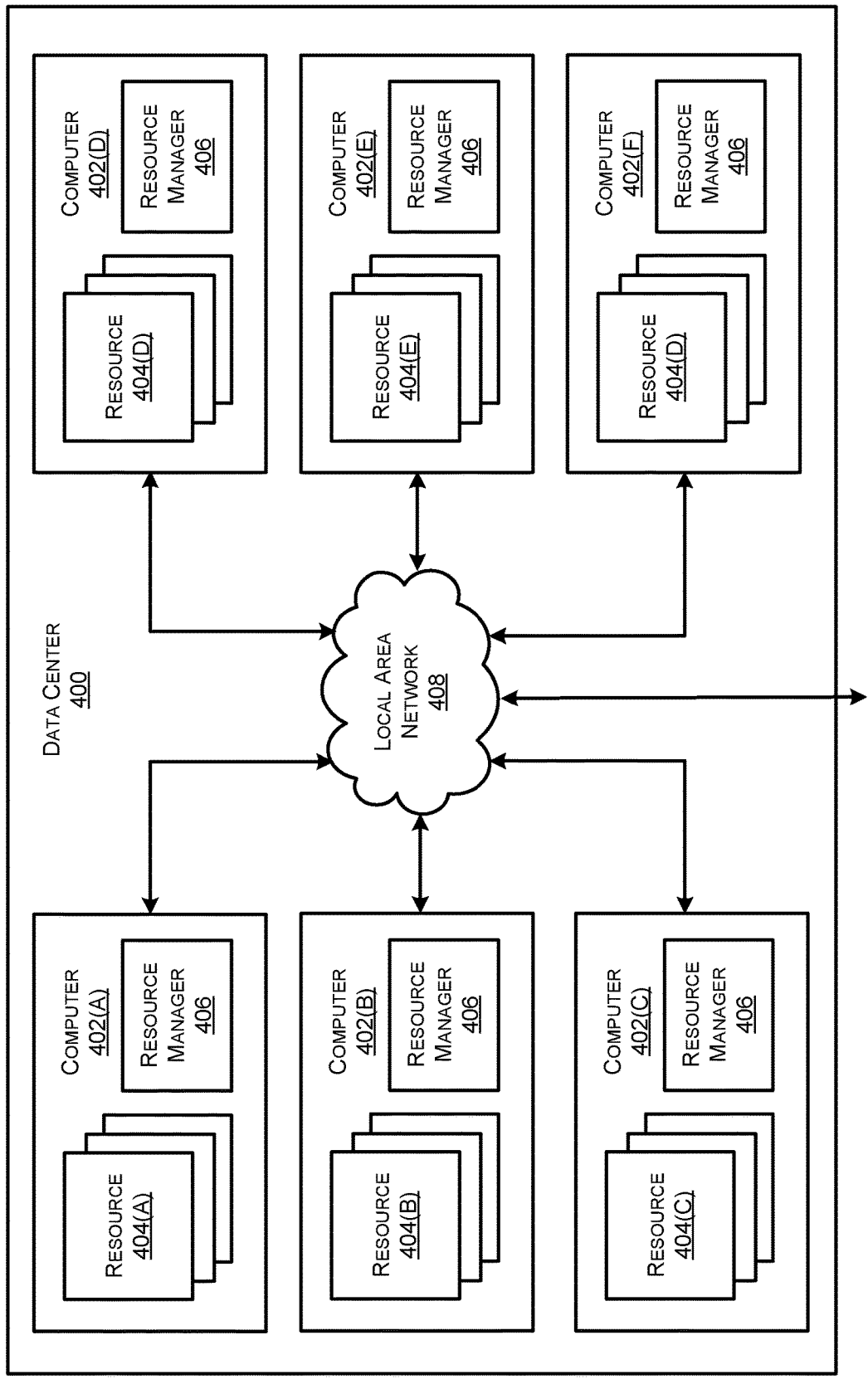
FIG. 4 illustrates a computing system diagram illustrating a configuration for a data center that can be utilized to implement aspects of the technologies disclosed herein.

FIG. 4 is a computing system diagram illustrating a configuration for a data center 400 that can be utilized to implement aspects of the technologies disclosed herein. The example data center 400 shown in FIG. 4 includes several computers 402A-402F (which might be referred to herein singularly as "a computer 402" or in the plural as "the computers 402") for providing computing resources. In some examples, the resources and/or computers 402 may include, or correspond to, any type of networked device described herein, such as one or more of edge nodes 104 and/or 106, map server 108, authentication server 110, and devices 112 and/or devices 114 (FIGS. 1A-1C). Although computers 402 may comprise any type of networked device, such as servers, switches, routers, hubs, bridges, gateways, modems, repeaters, access points, hosts, etc.

The computers 402 can be standard tower, rack-mount, or blade server computers configured appropriately for providing computing resources. In some examples, the computers 402 may provide computing resources 404 including data processing resources such as virtual machine (VM) instances or hardware computing systems, database clusters, computing clusters, storage clusters, data storage resources, database resources, networking resources, and others. Some of the computers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single computer 402. Computers 402 in the data center 400 can also be configured to provide network services and other types of services.

In the example data center 400 shown in FIG. 4, an appropriate local area network (LAN) 408 is also utilized to interconnect the computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the computers 402A-402F in each data center 400, and, potentially, between computing resources in each of the computers 402. It should be appreciated that the configuration of the data center 400 described with reference to FIG. 4 is merely illustrative and that other implementations can be utilized.

In some examples, the computers 402 may each execute one or more application containers and/or virtual machines to perform techniques described herein. For instance, the containers and/or virtual machines may serve as nodes in the cloud computing network 102, such as edge nodes 104 and/or 106.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
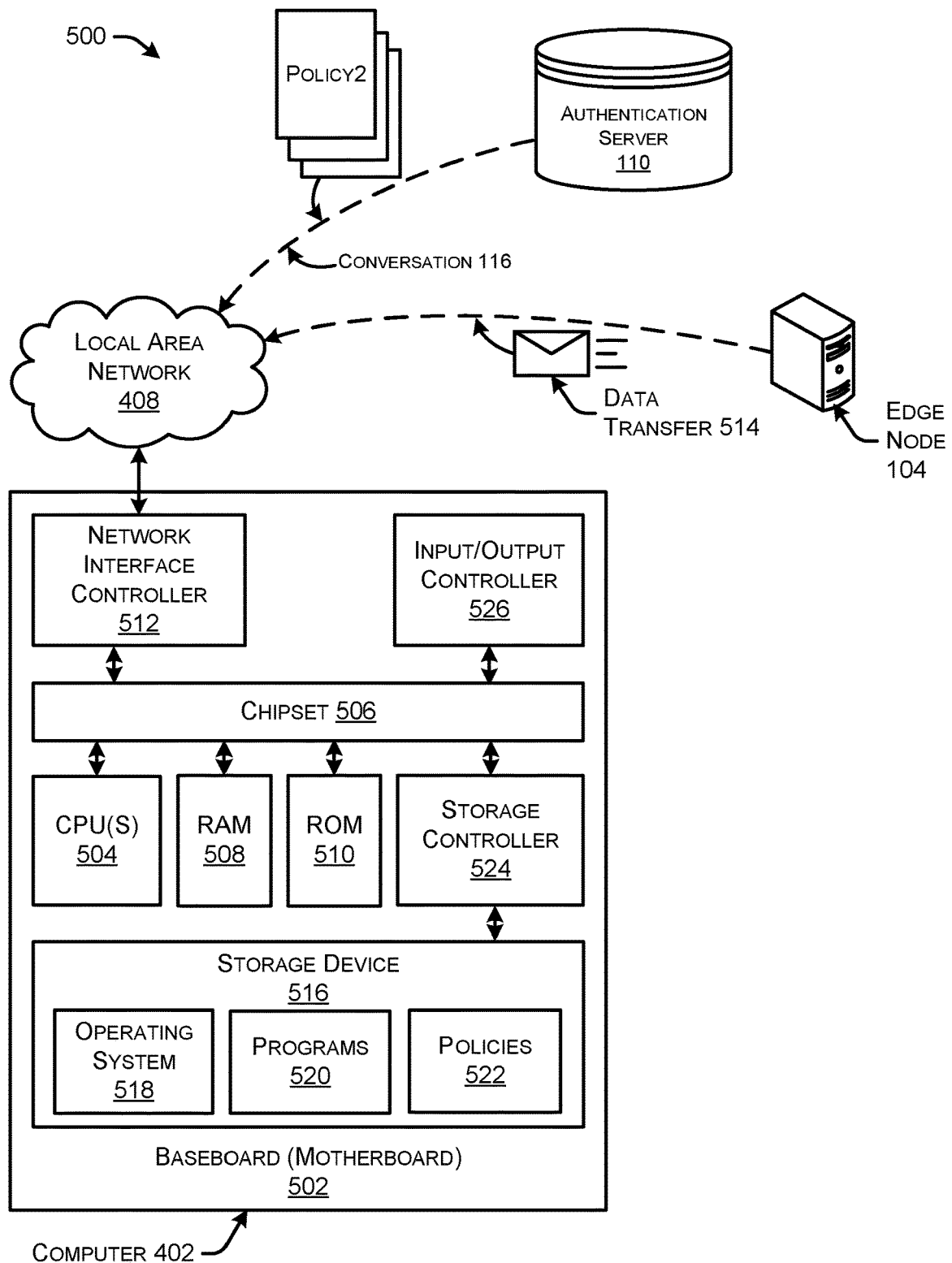
FIG. 5 is a computer architecture diagram showing an illustrative computer hardware architecture for implementing a computing device that can be utilized to implement aspects of the various technologies presented herein.

FIG. 5 shows an example computer architecture 500 for a computer 402 capable of executing program components for implementing the functionality described above. The computer architecture 500 shown in FIG. 5 illustrates a conventional server computer, workstation, desktop computer, laptop, tablet, network appliance, e-reader, smartphone, and/or other computing device, and can be utilized to execute any of the software components presented herein. The computer 402 may, in some examples, correspond to a physical device described herein (e.g., edge nodes, map server, authentication server, host devices, source devices, destination devices), and may comprise networked devices such as servers, switches, routers, hubs, bridges, gateways, modems, repeaters, access points, etc. For instance, computer 402 may correspond to edge node 106.

As shown in FIG. 5, the computer 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 402 can operate in a networked environment using logical connections to remote computing devices and computer systems through a network, such as the network 408 (and/or 102). The chipset 506 can include functionality for providing network connectivity through a network interface controller (NIC) 512, such as a gigabit Ethernet adapter. The NIC 512 is capable of connecting the computer 402 to other computing devices over the network 408 (and/or 102). For instance, in the example shown in FIG. 5, NIC 512 may help facilitate example conversations 116 over the network 408 with edge node 104 and/or authentication server 110. As shown in FIG. 5, NIC 512 may also help facilitate download of a policy (e.g., Policy2) and/or multiple policies from authentication server 110. NIC 512 may also help facilitate a data transfer 514 from edge node 104. In some examples, the download of a policy and/or the data transfer 514 may be considered part of the conversation 116 between devices of the network. It should be appreciated that multiple NICs 512 can be present in the computer 402, connecting the computer to other types of networks and remote computer systems.

The computer 402 can be connected to a storage device 516 that provides non-volatile storage for the computer. The storage device 516 can store an operating system 518, programs 520, policies 522, and/or data, which have been described in greater detail herein. The storage device 516 can be connected to the computer 402 through a storage controller 524 connected to the chipset 506, for example. The storage device 516 can consist of one or more physical storage units. The storage controller 524 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 516 is characterized as primary or secondary storage, and the like.

For example, the computer 402 can store information to the storage device 516 by issuing instructions through the storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 516 by detecting the physical states or characteristics of one or more particular locations within the physical storage units.

In addition to the mass storage device 516 described above, the computer 402 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 402. In some examples, the operations performed by the network 102, and or any components included therein, may be supported by one or more devices similar to computer 402. Stated otherwise, some or all of the operations performed by the network 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 516 can store an operating system 518 utilized to control the operation of the computer 402. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 516 can store other system or application programs and data utilized by the computer 402.

In one embodiment, the storage device 516 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regard to FIGS. 1A-4. The computer 402 can also include computer-readable storage media having instructions stored thereupon for performing any of the other computer-implemented operations described herein.

The computer 402 can also include one or more input/output controllers 526 for receiving and processing input from a number of input devices, such as a keyboard, a mouse, a touchpad, a touch screen, an electronic stylus, or other type of input device. Similarly, an input/output controller 526 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

As described herein, the computer 402 may comprise one or more devices, such as edge nodes 104 and/or 106, map server 108, authentication server 110, devices 112, and/or devices 114. The computer 402 may include one or more hardware processors 504 (processors) configured to execute one or more stored instructions. The processor(s) 504 may comprise one or more cores. Further, the computer 402 may include one or more network interfaces configured to provide communications between the computer 402 and other devices, such as the communications described herein as being performed by edge nodes 104 and/or 106, map server 108, authentication server 110, devices 112, devices 114. In some examples, the communications may include the example conversations 116, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 520 may comprise any type of programs or processes to perform the techniques described in this disclosure in accordance with conversation-based policy distribution techniques. For instance, the programs 520 may cause the computer 402 to perform techniques for communicating with other devices using any type of protocol or standard usable for determining connectivity. Additionally, the programs 520 may comprise instructions that cause the computer 402 to perform the specific techniques for conversation-based policy distribution, such as specifying, identifying, downloading, installing, and/or deleting policies.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a destination edge node in a network, a map cache request from a map server in the network, the map cache request including an indication of a destination device with which a source edge node is requesting to communicate;
   based at least in part on receiving the map cache request:
      selecting, from among a first host device and a second host device communicatively coupled to the destination edge node, the first host device as the destination device; and
      sending, from the destination edge node, an indication of a destination address associated with the destination device to the source edge node;
   based at least in part on selecting the first host device as the destination device, sending, from the destination edge node, a policy download trigger to an authentication server to trigger download of a policy associated with transferring data to the destination device;
   receiving, at the destination edge node, the policy from the authentication server;
   receiving, at the destination edge node, a data transfer originating from a source device associated with the source edge node, the data transfer associated with the map cache request; and
   determining, based at least in part on the policy, whether to communicate the data transfer to the destination device.

2. The method of claim 1, wherein the policy download trigger is sent to the authentication server in response to receiving the map cache request.

3. The method of claim 1, further comprising:
   receiving, from the source edge node, a specific policy trigger that includes information regarding the source device and the destination device.

4. The method of claim 3, wherein the policy download trigger includes the specific policy trigger.

5. The method of claim 1, wherein the indication of the destination address is sent to the source edge node concurrently with sending the policy download trigger to the authentication server.

6. The method of claim 1, further comprising:
   receiving, from the source edge node, a specific policy trigger that includes information regarding the source device and the destination device,
   wherein the policy download trigger is sent to the authentication server after the destination edge node receives the specific policy trigger and the policy download trigger includes the specific policy trigger.

7. The method of claim 1, further comprising:
   receiving, at the destination edge node, a deletion message from the source edge node; and
   deleting the policy from the destination edge node based at least in part on the deletion message.

8. The method of claim 1, further comprising:
   in response to sending the policy download trigger, receiving, at the destination edge node and from the authentication server, multiple policies related to the destination device; and
   selecting the policy from among the multiple policies based on source device information included in the data transfer.

9. A computing device comprising:
   one or more processors; and
   one or more non-transitory computer-readable media storing computer-executable instructions that, when executed by the one or more processors, cause the one or more processors to:
      receive a map cache request from a map server in a network, the map cache request including an indication of a destination device with which an edge node is requesting to communicate;
      based at least in part on receiving the map cache request:
         select, from among a first host device and a second host device communicatively coupled to the computing device, the first host device as the destination device, and
         send an indication of a destination address associated with the destination device to the edge node;
      based at least in part on selecting the first host device as the destination device, send a policy download trigger to an authentication server to trigger download of a policy associated with transferring data to the destination device;
      receive the policy from the authentication server;
      receive a data transfer originating from a source device associated with the edge node; and
      determine, based at least in part on the policy, whether to communicate the data transfer to the destination device.

10. The computing device of claim 9, wherein the computer-executable instructions further cause the one or more processors to:
    send the policy download trigger to the authentication server in response to receiving the map cache request.

11. The computing device of claim 9, wherein the computer-executable instructions further cause the one or more processors to:
    receive, from the edge node, a specific policy trigger that includes information regarding the source device and the destination device.

12. The computing device of claim 11, wherein the policy download trigger includes the specific policy trigger.

13. The computing device of claim 9, wherein the computer-executable instructions further cause the one or more processors to:
    send the indication of the destination address to the edge node concurrently with sending the policy download trigger to the authentication server.

14. The computing device of claim 9, wherein the computer-executable instructions further cause the one or more processors to:
    receive, from the edge node, a specific policy trigger that includes information regarding the source device and the destination device,
    wherein the policy download trigger is sent to the authentication server after the computing device receives the specific policy trigger.

15. The computing device of claim 9, wherein the computer-executable instructions further cause the one or more processors to:
    receive a deletion message from the edge node; and
    delete the policy from the computing device based at least in part on the deletion message.

16. The computing device of claim 9, wherein the computing device is manifest as another edge node communicatively coupled to the network and to the destination device.

17. A computing device comprising:
one or more processors; and
one or more non-transitory computer-readable media storing computer-executable instructions that, when executed by the one or more processors, cause the one or more processors to:
receive a communication that includes identification of a destination device associated with the computing device and includes a source device address of a source device associated with an edge node, where the edge node is requesting a data transfer between the source device and the destination device across a network;
send a destination device address of the destination device to the edge node;
based at least in part on receiving the communication, send a policy download trigger to an authentication server, the policy download trigger including the source device address;
in response to sending the policy download trigger to the authentication server, receive a policy from the authentication server, the policy relating to the data transfer between the source device and the destination device;
receive the data transfer originating from the source device; and
determine, based at least in part on the policy, whether to communicate the data transfer to the destination device.

18. The computing device of claim 17, wherein the computer-executable instructions further cause the one or more processors to:
send the destination device address to the edge node at substantially the same time as sending the policy download trigger to the authentication server.

19. The computing device of claim 17, wherein the computer-executable instructions further cause the one or more processors to:
install the policy at the computing device before the data transfer is received at the computing device.

20. The computing device of claim 17, wherein the policy received from the authentication server is specific to the data transfer between the source device and the destination device.

\* \* \* \* \*